June 29, 1937.  F. S. WILLIAMS  2,085,460
TRAY FOR JEWELRY AND THE LIKE
Filed Feb. 20, 1936  2 Sheets-Sheet 1
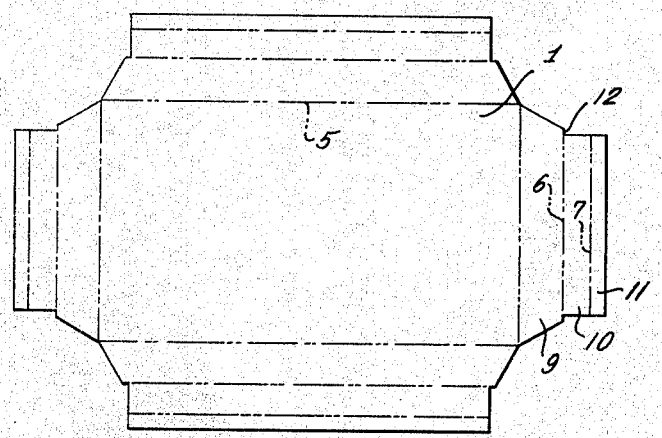
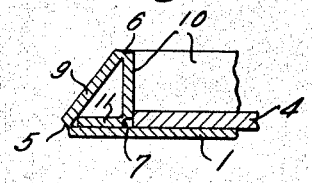
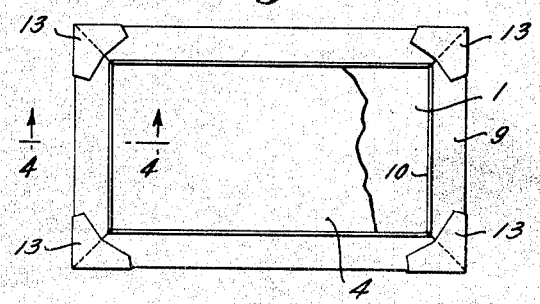
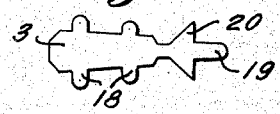
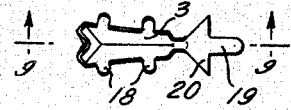
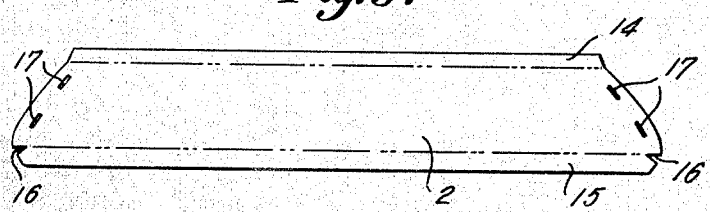
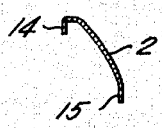
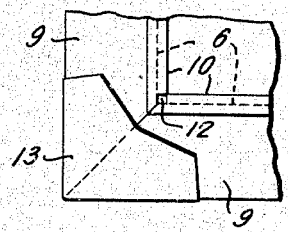
Inventor,
Frank S. Williams,
by Roberts, Cushman & Woodberry
Attys.

June 29, 1937.  F. S. WILLIAMS  2,085,460
TRAY FOR JEWELRY AND THE LIKE
Filed Feb. 20, 1936  2 Sheets—Sheet 2
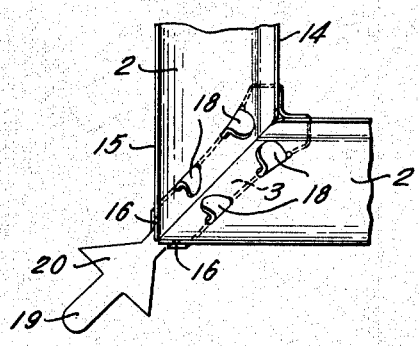
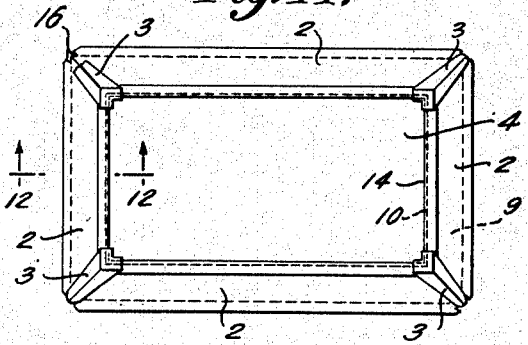
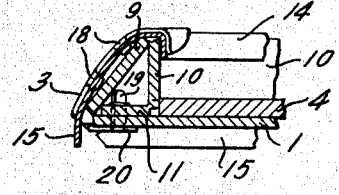
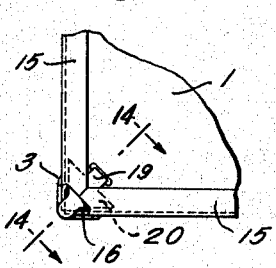
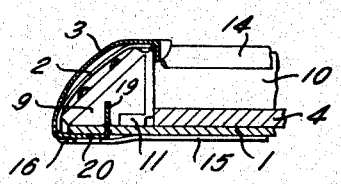
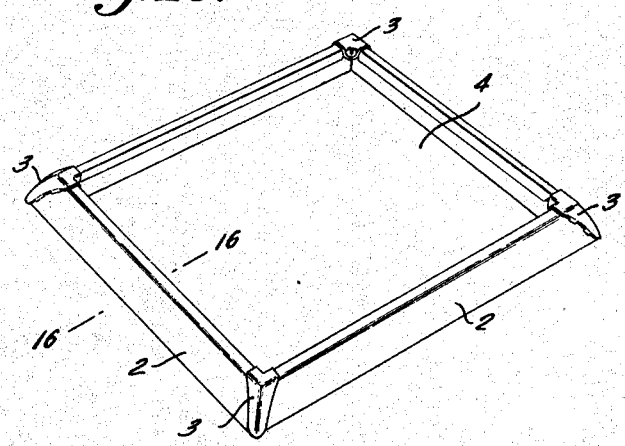
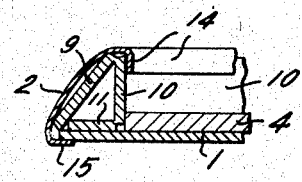
Inventor,
Frank S. Williams,
by Roberts, Cushman & Woodbury.
Attys.

Patented June 29, 1937

2,085,460

UNITED STATES PATENT OFFICE 2,085,460

TRAY FOR JEWELRY AND THE LIKE

Frank S. Williams, Providence, R. I., assignor to The Mason Box Company, Attleboro Falls, Mass., a corporation of Massachusetts Application February 20, 1936, Serial No. 64,833

13 Claims. (Cl. 229—34)

While the trays herein described and claimed are particularly suitable for jewelry and the like they may be used, not only in horizontal position but also in inclined and vertical position, to display other articles, the dimensions of the tray corresponding of course to the size and shape of the article to be housed and/or displayed.

Objects of the invention are to provide trays which, while light in weight, are rigid in construction and durable in use and which can be manufactured with facility and economy, and generally to improve the art to which the invention relates. Other objects will be evident from the following description and the appended claims.

In one aspect the invention comprises a frame, tray or box formed of cardboard or the like by providing side extensions which may be folded into the form of a rim comprising inner and outer walls, the outer wall preferably comprising sloping sides and the inner walls preferably having integral flanges extending outwardly to the sloping sides to brace the walls.

In another aspect the invention involves side pieces of sheet metal or other form-sustaining sheet material in combination with corner members of the same or similar material, the side pieces and corner members being detachably interlocked in the form of a frame which is preferably adapted to be applied to the aforesaid tray or box after the pieces and members have been interconnected in a unitary assemblage.

For the purpose of illustration a preferred embodiment is shown in the accompanying drawings, in which, Fig. 1 is a plan view of the cardboard body of a box before the blank is folded;

Fig. 2 is a similar view after the blank is folded;

Fig. 3 is an enlarged plan view of one corner of the cardboard box;

Fig. 4 is a section on line 4—4 of Fig. 2;

Fig. 5 is a side elevation on a blank for making a metallic side piece for the box;

Fig. 6 is a section of the metallic side piece after it has been partially shaped;

Fig. 7 is a plan view of a blank for making a metallic corner member;

Fig. 8 is a similar view after the blank has been shaped for application to the corner of the box;

Fig. 9 is a section on line 8—8 of Fig. 7;

Fig. 10 is a bottom plan view of one corner of the metallic parts of the box after they have been joined together in the form in which they are applied to the cardboard body;

Fig. 11 is a top plan view of the metallic parts after they have been joined together in the form in which they are applied to the cardboard body;

Fig. 12 is a section on line 12—12 of Fig. 11;

Fig. 13 is a bottom plan view of one corner of the finished box;

Fig. 14 is a section on line 14—14 of Fig. 13;

Fig. 15 is a perspective view of the finished box; and

Fig. 16 is a section on line 16—16 of Fig. 15.

The particular embodiment of the invention chosen for the purpose of illustration comprises a cardboard backing 1, sheet-metal side pieces 2, sheet-metal corner members 3 and a cardboard insert 4.

The cardboard body of the box comprises integral extensions defined by score lines 5 and divided by score lines 6 and 7 into three sections 9, 10 and 11. As shown in Fig. 1 the section 9 tapers in length and the sections 10 and 11 are shorter than the shortest length of the section 9 so as to form shoulders 12 at the junctions between the sections 9 and 10. After the extensions are folded to form the rim of the box, as shown in Figs. 2 and 3, the section 9 constitutes a sloping outer side, the section 10 constitutes a vertical inner wall and the section 11 a flange which seats against the backing 1 and against the sloping outer side 9 to brace the wall 10 against outward movement at the bottom. The insert 4, which snugly fits in the box and is cemented to the bottom thereof, serves to brace the walls 10 against inward movement. As shown in Fig. 3 the offset shoulders 12 prevent interference between the walls 10 when the cardboard extensions are folded to form the rim of the box, thereby affording good joints at the corners. After the extensions have been folded as aforesaid they are held in position by paper stays 13 cemented over the corners of the rim as shown in Figs. 2 and 3.

As shown in Fig. 5 the blank side pieces comprise upper and lower extensions 14 and 15, notches 16 at the lower corners and slots 17 adjacent each end. Before the side pieces are applied to the cardboard box they are partially shaped as shown in Fig. 6 to fit over the sides of the box, the only shaping operation remaining to be done after the sides are applied to the box consisting in folding the lower extensions 15 inwardly at right-angles under the cardboard backing 1.

As shown in Fig. 7 the blanks for the corner members 3 comprise lateral tongues 18 and a tab 19 having a wedge-shaped portion 20. Before the corner pieces are applied to the box they are preshaped as shown in Figs. 8 and 9 so that each member is curved longitudinally and has an approximately right-angle cross-section, the tongues 18 being bent inwardly into approximately parallel relationship and the upper ends (the left-hand ends in Figs. 7, 8, and 9) being shaped to fit into the corners of the cardboard box.

Before the metal parts are applied to the cardboard box they are interconnected as shown in Figs. 10 and 11, the tongues 18 being inserted through the slots 17 and then bent toward the mitre joint (Fig. 10). With the assemblage of metal parts in inverted position as shown in Fig. 10 the cardboard box, also in inverted position, is placed in the assembly and the extensions 20 of the corner members 3 are then bent over the backing 1 as shown in Fig. 12, the tab 19 being bent at right-angles to the wedge-shaped part 20 and forced through the cardboard backing 1. The final step of the process consists in bending the lower flanges 15 of the side pieces 2 from the position shown in Fig. 12 to a position against the bottom of the backing 1 as shown in Figs. 13, 14, and 16. Thus the flanges 15 of the side pieces overlap the wedge-shaped portions 20 of the corner members and the shape of the portions 20 is such that their sloping edges abut the side pieces inside the fold lines of their lower flanges 15. In the finished product the side pieces 2 comprise channels having upper and lower flanges 14 and 15 overlapping the upper and lower edges of the tray (Fig. 16).

It should be understood that the present disclosure is for the purpose of illustration only and that this invention includes all modifications and equivalents which fall within the scope of the appended claims.

I claim:

1. A tray comprising a cardboard backing having integral extensions folded upwardly to form outer sides and thence folded downwardly to form inner walls, side pieces of sheet material on said sides with flanges behind said backing and notches at the ends of the flanges, and corner members overlapping the adjacent ends of said pieces with tabs extending through said notches under said flanges, the side pieces having openings near their ends and said members having tongues extending through said openings.

2. A tray comprising side pieces of sheet material having inturned flanges at the back, and corner members overlapping the adjacent ends of said pieces with tabs extending between said ends and thence under said flanges, said tabs having widened portions under the flanges to restrain withdrawal of the tabs.

3. A tray comprising side pieces of sheet material having inturned flanges at the back and notches at the ends of the flanges, and corner members overlapping the adjacent ends of said pieces with tabs extending through said notches under said flanges.

4. A tray comprising side pieces of sheet material having inturned flanges at the back and notches at the ends of the flanges, and corner members overlapping the adjacent ends of said pieces with tabs extending through said notches under said flanges, said tabs having widened portions under the flanges to prevent withdrawal of the tabs.

5. A tray comprising side pieces of sheet material having inturned flanges at the back and notches at the ends of the flanges, and corner members overlapping the adjacent ends of said pieces with tabs extending through said notches under said flanges, the side pieces having openings near their ends and said members having tongues extending through said openings.

6. A tray comprising a backing and sides, a piece of sheet material covering each of said sides, and corner members overlapping the adjacent ends of said pieces, said members having extensions bent behind said backing and fastened to the backing.

7. A tray for jewelry and other articles comprising a cardboard backing having integral extensions folded upwardly and inwardly to form outer sides, thence folded downwardly to form inner walls and thence folded outwardly to form flanges seating against the backing, the outer edges of the flanges seating against said sides to brace said walls, side pieces fitting over said sides with flanges behind the backing and openings at their adjacent ends, corner pieces overlapping said ends with tongues through said openings and tabs extending between said ends, thence under said flanges and thence hooking into said backing, the portion of each tab under said flanges being wedge-shaped to prevent withdrawal.

8. A tray comprising a back and sides, channels covering said sides with upper and lower flanges directed inwardly, and corner members overlapping adjacent ends of said channels with tabs extending through openings in the channels to interlock the channels together in the form of a frame.

9. A tray comprising a back and sides, channels fitting over said sides with flanges overlapping the upper and lower edges of said sides, and corner members overlapping adjacent ends of said channels with tabs extending through openings in the channels and thence extending between the abutting faces of the sides and channels.

10. A unitary assemblage for covering the sides of a tray or other article comprising elongate side pieces arranged end to end in the form of a rim with inturned flanges along corresponding sides to seat on one side of the article and marginal portions on their opposite sides to be turned over the opposite side of the article when the article is placed in the rim, and corner members interlocking with the side pieces to hold the side pieces together while the article is placed in the rim.

11. A unitary assemblage for covering the sides of a tray or other article comprising elongate side pieces arranged end to end in the form of a rim with inturned flanges along corresponding sides to seat on one side of the article and marginal portions on their opposite sides to be turned over the opposite side of the article when the article is placed in the rim, and corner members interlocking with the side pieces to hold the side pieces together while the article is placed in the rim, the corner members having tabs adapted to be bent over the latter side of the article to hold the article in the rim until said marginal portions are turned over as aforesaid.

12. A unitary assemblage for covering the sides of a tray or other article comprising elongate side pieces arranged end to end in the form of a rim with inturned flanges along corresponding sides to seat on one side of the article and marginal portions on their opposite sides to be turned over the opposite side of the article when the article is placed in the rim, and corner members interlocking with the side pieces to hold the side pieces together while the article is placed in the rim, the corner members having tabs adapted to be bent over the latter side of the article to hold the article in the rim until said marginal portions are turned over as aforesaid, said side pieces being cut away to accommodate said tabs.

13. The method of covering the sides of a tray or other article which comprises forming side pieces to cover the sides of the article, respectively, with inturned flanges to seat on one side of the article and marginal portions on their opposite sides to be turned over the opposite side of the article, interconnecting the ends of the side pieces with corner members to form a unitary rim, interfitting the rim and article with said flanges seating on one side of the article, and then turning said marginal portions over the opposite side of the article.

FRANK S. WILLIAMS.